E. R. WILLIAMS.
DEVICE FOR EVAPORATING LIQUIDS.
APPLICATION FILED FEB. 8, 1913.
1,124,369.
Patented Jan. 12, 1915.
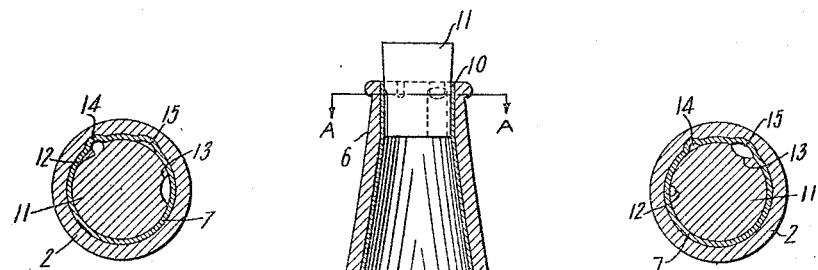
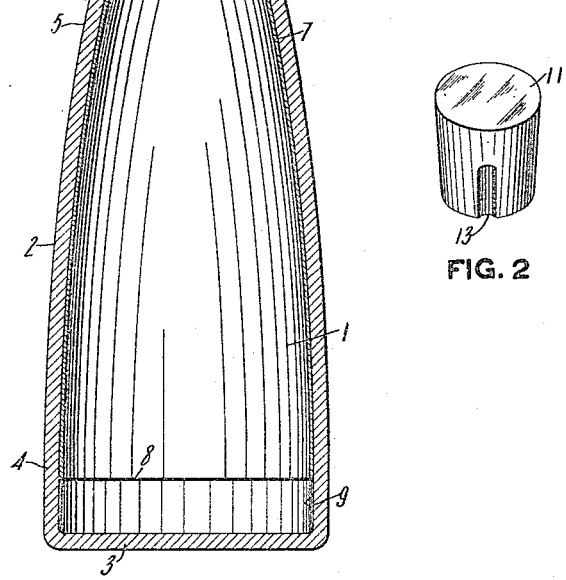
FIG. 3
FIG. 4
FIG. 2
FIG. 1
WITNESSES
INVENTOR

UNITED STATES PATENT OFFICE.

EDWARD R. WILLIAMS, OF SHARPSBURG, PENNSYLVANIA.

DEVICE FOR EVAPORATING LIQUIDS.

1,124,369. Specification of Letters Patent. Patented Jan. 12, 1915.

Application filed February 8, 1913. Serial No. 747,071.

*To all whom it may concern:*

Be it known that I, EDWARD R. WILLIAMS, a resident of Sharpsburg, in the county of Allegheny and State of Pennsylvania, have invented a new and useful Improvement in Devices for Evaporating Liquids, of which the following is a specification.

This invention relates to a device for evaporating liquids, such as disinfectants, deodorizers, air sweeteners or purifiers, perfumes, and the like.

The object of the invention is to produce a simple device of the character described which can be readily and cheaply manufactured, which will contain or hold a sufficient quantity or supply of liquid so that it needs to be replenished only at infrequent intervals, and which will give off the contents by slow surface evaporation at a uniform rate until entirely empty, which rate to a certain extent is controllable or capable of regulation.

The invention comprises the construction and arrangement of parts hereinafter described and claimed.

In the drawings Figure 1 is a sectional elevation of a device constructed according to my invention; Fig. 2 is a detail view of the stopper; and Figs. 3 and 4 are sectional views, taken on the line A—A, Fig. 1, and showing the stopper in different positions.

It is a well known fact that certain substances, such as clays, plaster of Paris, fine earth, pumice, and the like, when compacted into solid masses, have the property of absorbing or soaking up any liquid with which they may come in contact, and then giving the same off by slow evaporation from the surface. This is due to the porosity of the material and to the capillary attraction of the closely contacting particles thereof for liquids. At the same time such substances will only absorb or soak up a certain limited quantity of liquid, dependent upon the coarseness or fineness of the particles, and the nature of the particular substance of which they are composed. This quantity of liquid which is required to completely saturate the article or mass is never sufficient to permit any of the liquid contained in the substance to collect on or drip from this surface in the form of drops. It always passes off slowly by a process of surface evaporation, and at a rate dependent wholly upon the capacity or ability of the substance to conduct or transmit the liquid through its pores to the surface, and also upon the rate of supply of liquid to the material. By reason of the properties just referred to, substances of the character described are well adapted for use in the evaporation of liquids, such as disinfectants, deodorizers, air sweeteners or purifiers, perfumes, and the like.

According to my invention I provide a receptacle or container 1 for holding the liquid to be evaporated. This receptacle may be made of any size and of any shape in cross section. It is preferably made large enough to hold sufficient liquid for a comparatively long period of time, although the period of evaporation may vary with different liquids. The container or holder comprises a body portion 2, having a bottom 3, and which is made of any of the materials above mentioned, but preferably of some substance containing at least a large proportion of clay, so that it will be porous and give off by surface evaporation the liquid contained therein.

An important feature of the invention is the formation of the receptacle with its lower portion of larger size or diameter than its upper portion. As shown in the drawings, the receptacle is shaped something like an ordinary bottle, with its lower portion 4 of one diameter and its upper portion 5 gradually tapering or of reduced size toward the restricted neck 6. As the level of liquid in the receptacle lowers, by evaporation thereof from the outer surface, the inner surface of the receptacle in contact with the liquid gradually becomes less and less, with a consequent decrease in the capacity or ability of the body material to soak up or absorb the liquid. Since, however, the largest portion of the receptacle is at the bottom, a maximum of absorbing surface, in proportion to the volume of liquid remaining in the receptacle, will be effective until the last remnant of liquid is evaporated. Moreover, when the level of liquid is low, the side walls of the receptacle not only act to transmit or carry the liquid horizontally directly therethrough to the outer evaporating surface, but also act somewhat after the manner of a wick to carry or lift the liquid upwardly by capillary attraction to the upper portion of the receptacle. If the receptacle were cylindrical, or of uniform size from top to bottom, or were larger at the top than at the bottom, the lower portion of the wall would not be able, when the liquid is low, to both transmit the same therethrough and also upwardly to the upper portion of the wall. Consequently, as the level of liquid lowers, the upper portion of the outer evaporating surface would gradually become dry, or, in other words, the effective evaporating surface would decrease. With my arrangement the larger lower portion of the receptacle is always able to both transmit liquid therethrough, and also upwardly to the upper portion of the wall, and the effective evaporating surface is a constant quantity irrespective of the level of liquid in the receptacle. I may also provide the inner surface of the receptacle wall with a coating or lining 7, of suitable non-porous material. This coating or lining may be made of any substance not affected by the liquid to be evaporated, and may for example, be paraffin, a glaze, glass, or the like. It may be either applied directly to the inner surface of the body portion 2 of the receptacle, as in the case of paraffin or a glaze, or the body portion 2 may be built up around a hollow tube or form of the non-porous material. This lining or coating stops a little short of the extreme bottom of the receptacle, as indicated at 8, so as to leave a portion 9 of the inner surface of the receptacle uncoated.

With the construction just described the amount of surface contacted by the liquid within the receptacle will always be the same, so long as the level of liquid is above the lower edge 8 of the coating or lining 7. This will insure a practically uniform rate of absorption and evaporation of the liquid. By varying the position or location of the edge 8 of the lining the rate of absorption, and consequently the rate of evaporation, may, within certain limits, be made as rapid or as slow as desired. The coating or lining 7 described may be used either with a receptacle of uniform size from top to bottom, or with a receptacle wherein the size varies from top to bottom.

The rate of evaporation may also be regulated to a certain degree by controlling or regulating the admission of air to the space within the container. As shown, the filling opening 10 in the neck 6 is closed by a cork or stopper 11, of any suitable material, and which is provided in its side surface or face with a plurality of ports or passages, two being shown, for admitting air to the container. These passages, which are respectively marked "12" and "13," are of different size, and only extend part way up the side of the stopper. The inner surface of the neck 6 is also provided with a plurality of corresponding passages 14, 15, which extend part way down the same. In one position of the stopper, shown in Fig. 3, the small passage 12 of the stopper is in registration with the small passage 14 in the neck, while in the other position of the stopper, shown in Fig. 4, the outer passages 13, 15, are in registration. If the sizes of the passages through the stopper and neck are made sufficiently large so that air will be supplied to the receptacle faster than liquid is withdrawn or evaporated therefrom, the rate of evaporation will depend wholly upon the amount of evaporating surface and the amount of surface in contact with the liquid. If, however, the passages are so small that air cannot enter therethrough as fast as liquid can be avaporated from the receptacle, there will be resistance to evaporation, and the rate thereof will be retarded. By turning the stopper through an angle of about 180° from the position shown in Fig. 3, both sets of passages may be closed, thus preventing wholly the entrance of air and practically preventing evaporation.

The device described is extremely simple and can be made at comparatively low cost. It furnishes a convenient means for evaporating any liquid and will give the same off into the air at substantially a uniform rate.

What I claim is:—

1. A device for evaporating liquids, comprising a receptacle having a top opening so restricted as to check the normal outward flow of liquid and having its side walls formed of porous material and adapted to transmit therethrough and give off by evaporation from the entire outer surface thereof liquid contained in said receptacle, and means arranged to allow contact of the liquid in said receptacle with only a limited portion of the inner surface of the porous material, to thereby secure a uniform rate of evaporation independent of the height of the liquid in the receptacle.

2. A device for evaporating liquids, comprising a receptacle having a top opening so restricted as to check the normal outward flow of liquid and having its side walls formed of porous material and adapted to transmit therethrough and give off by evaporation from the entire outer surface thereof liquid contained in said receptacle, said receptacle decreasing in horizontal cross sectional dimensions from its bottom to its top, and means arranged to allow contact of the liquid in said receptacle with only a limited portion of the inner surface of the porous material, to thereby secure a uniform rate of evaporation independent of the height of the liquid in the receptacle.

3. A device for evaporating liquids, comprising a receptacle formed of porous material, said receptacle being of smaller size at its top than at its bottom, and means arranged to vary the supply of air to the space within, said receptacle to thereby control the rate of evaporation of the liquid.

4. A device for evaporating liquids, comprising a receptacle having a body portion formed of porous material, and having the upper portion of its inner surface provided with a coating or layer of non-porous material.

5. A device for evaporating liquids, comprising a receptacle formed of porous material, and a lining or coating of non-porous material for the inner surface of said receptacle, the lower portion of the inner surface of the receptacle being left uncoated.

6. A device for evaporating liquids, comprising a receptacle of smaller size at its top than at its bottom and provided on its inner surface with a coating of non-porous material, the bottom portion of the inner surface of the body material being left uncoated.

7. A device for evaporating liquids, comprising a receptacle formed of porous material and decreasing in cross sectional dimensions from its bottom to its top, said receptacle having a top opening for the admission of air thereto, said opening being restricted and of such size as to limit the flow of liquid through the walls of the receptacle and the rate of evaporation from the outer surface of the receptacle and the rate of evaporation from the surface of the liquid within said receptacle.

8. A device for evaporating liquids, comprising a receptacle having a top opening and having its side walls formed of porous material and adapted to transmit therethrough and give off by evaporation from the outer surface thereof liquid contained in said receptacle, the top opening being so restricted as to check the normal outward flow of liquid through the walls of the receptacle.

In testimony whereof, I have hereunto set my hand.

EDWARD R. WILLIAMS.

Witnesses:
 ELBERT L. HYDE,
 WILLIAM P. LARKIN.

Copies of this patent may be obtained for five cents each, by addressing the "Commissioner of Patents, Washington, D. C."